United States Patent
Agarwal et al.

(10) Patent No.: US 8,125,510 B2
(45) Date of Patent: Feb. 28, 2012

(54) REMOTE WORKSPACE SHARING

(76) Inventors: Ankur Agarwal, Cambridge (GB);
Antonio Criminisi, Cambridge (GB);
Bill Buxton, Toronto (CA); Andrew Blake, Cambridge (GB); Andrew Fitzgibbon, Cambridge (GB)

( * ) Notice: Subject to any disclaimer, the term of this patent is extended or adjusted under 35 U.S.C. 154(b) by 1402 days.

(21) Appl. No.: 11/669,107

(22) Filed: Jan. 30, 2007

(65) Prior Publication Data
US 2008/0184124 A1    Jul. 31, 2008

(51) Int. Cl.
*H04N 7/14* (2006.01)

(52) U.S. Cl. ............. 348/14.08; 348/14.1; 348/14.12; 715/753

(58) Field of Classification Search .... 348/14.01–14.16; 382/173, 156; 709/204, 205; 715/753, 755, 715/751
See application file for complete search history.

(56) References Cited

U.S. PATENT DOCUMENTS

| | | | |
|---|---|---|---|
| 4,974,173 A | 11/1990 | Stefik et al. | |
| 5,107,443 A | 4/1992 | Smith et al. | |
| 5,444,476 A * | 8/1995 | Conway | 348/14.1 |
| 5,990,932 A | 11/1999 | Bee et al. | |
| 6,049,334 A | 4/2000 | Bates et al. | |
| 6,262,409 B1 | 7/2001 | Avaro et al. | |
| 6,554,433 B1 | 4/2003 | Holler | |
| 6,731,308 B1 | 5/2004 | Tang et al. | |
| 6,956,614 B1 | 10/2005 | Quintana et al. | |
| 6,963,334 B1 | 11/2005 | Stevens et al. | |
| 7,092,002 B2 * | 8/2006 | Ferren et al. | 348/14.08 |
| 7,609,288 B2 * | 10/2009 | Guo et al. | 348/14.08 |
| 7,920,159 B2 * | 4/2011 | Ueno et al. | 348/14.08 |
| 2005/0138566 A1 | 6/2005 | Muller et al. | |
| 2005/0180631 A1 * | 8/2005 | Zhang et al. | 382/173 |
| 2006/0010125 A1 | 1/2006 | Beartusk et al. | |
| 2008/0031327 A1 * | 2/2008 | Wang et al. | 375/240.12 |

FOREIGN PATENT DOCUMENTS

| | | |
|---|---|---|
| EP | 0961227 A1 | 1/1999 |
| KR | 20030059782 | 7/2003 |
| KR | 20060063558 | 6/2006 |
| KR | 20070009899 | 1/2007 |

(Continued)

OTHER PUBLICATIONS

Fussell, et al., "Effects of Head-Mounted and Scene-Oriented Video Systems on Remote Collaboration on Physical Tasks", available at least as early as Nov. 27, 2006, at <<http://portal.acm.org/citation.cfm?doid=642611.642701>>, ACM, vol. 5, No. 1, 2003, pp. 513-520.

(Continued)

*Primary Examiner* — Melur Ramakrishnaiah
(74) *Attorney, Agent, or Firm* — Lee & Hayes, PLLC

(57) ABSTRACT

Existing remote workspace sharing systems are difficult to use. For example, changes made on a common work product by one user often appear abruptly on displays viewed by remote users. As a result the interaction is perceived as unnatural by the users and is often inefficient. Images of a display of a common work product are received from a camera at a first location. These images may also comprise information about objects between the display and the camera such as a user's hand editing a document on a tablet PC. These images are combined with images of the shared work product and displayed at remote locations. Advance information about remote user actions is then visible and facilitates collaborative mediation between users. Depth information may be used to influence the process of combining the images.

18 Claims, 9 Drawing Sheets

FOREIGN PATENT DOCUMENTS

| WO | WO9847061 | 10/1998 |
|---|---|---|
| WO | WO9951023 | 10/1999 |

OTHER PUBLICATIONS

Kuzuoka, "Spatial Workspace Collaboration: A Sharedview Video Support System for Remote Collaboration Capability", available at least as early as Nov. 27, 2006, at <<http://portal.acm.org/citation.cfm?id=142750.142980>>, ACM, 1992, pp. 533-540.

Scott, et al., "Towards Seamless Support of Natural Collaborative Interactions", available at least as early as Nov. 27, 2006, at <<http://www.edgelab.ca/publications/gi2000_scott.pdf>>, pp. 1-8.

Tang, et al., "VideoWhiteboard: Video shadows to support remote collaboration", available at least as early as Nov. 27, 2005, ACM, 1991, pp. 315-322.

Tang, John C. et al., "Videodraw: A Video Interface for Collaborative Drawing", 1990 ACM, Apr. 1990, pp. 313-320.

International Search Report dated Apr. 18, 2008 from corresponding PCT Application No. PCT/US2008/052541 filed Jan. 30, 2008, 3 pages.

EPO Communication dated Apr. 29, 2011, 5 pages.

Yokoyo, et al. "Stereo Vision Based Video See0through Mixed Reality" Nara Institute of Science and Technology, Japan, Published 1999, pp. 131-145.

\* cited by examiner

REMOTE WORKSPACE SHARING

BACKGROUND

Existing systems for remote workspace sharing typically enable a first user at one physical location to perform a task in a workspace, such as editing a document, whilst one or more remote users view changes being made to the work product by the first user. A remote user is then able to make changes to the work product and so on to enable remote collaboration. Typically, only one user at a time is able to make changes to the work product using the system. In addition, changes made on the common work product by one user often appear abruptly on displays used by the other users. As a result the interaction is perceived as unnatural by the users and is often inefficient. Such remote collaboration tools are often clumsy and limited in their ability to support fluent interaction over drawings, documents or other work products, in a way that users are familiar with from face-to-face communication.

For example, remote collaboration tools are known which enable users at different geographical locations to work on a common work product over a communications network. However, typically these require a first user to make a specific sequence of user actions to allow other people to control the first user's shared programs or desktop. Once this has been done, the first user might receive a request message from a second user at another location. That second user may request to take control of the first user's shared programs. The first user may then make user actions to release control to the second user. To pass control back to the first user, a similar sequence of actions needs to be taken. Thus to enable collaborative work to be carried out time consuming and complex user inputs need to be made to pass control between the users. This is not user friendly and collaborative work suffers as a result.

Remote collaboration software applications such as shared whiteboards are also known. However, a drawback here is the abrupt appearance of actions on the shared whiteboard or other work product which makes the system difficult to use. For example, suppose two users at different locations are using a shared whiteboard tool to brainstorm ideas. The whiteboard may display several items of text over large parts of the screen. If one user adds a small item of text in one area, this appears abruptly on the common whiteboard display and may not be detected by all the users. The user adding the text knows where to expect this text to appear but the other user does not. If that user is looking away or not attending when the abrupt change appears it is then difficult for that user to locate the amendment.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Existing remote workspace sharing systems are difficult to use. For example, changes made on a common work product by one user often appear abruptly on displays viewed by remote users. As a result the interaction is perceived as unnatural by the users and is often inefficient. Images of a display of a common work product are received from a camera at a first location. These images may also comprise information about objects between the display and the camera such as a user's hand editing a document on a tablet PC. These images are combined with images of the shared work product and displayed at remote locations. Advance information about remote user actions is then visible and facilitates collaborative mediation between users. Depth information may be used to influence the process of combining the images.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a shared whiteboard system, the system described is provided as an example and not a limitation. As those skilled in the art will appreciate, the present examples are suitable for application in a variety of different types of remote collaboration systems.

Figure 1:
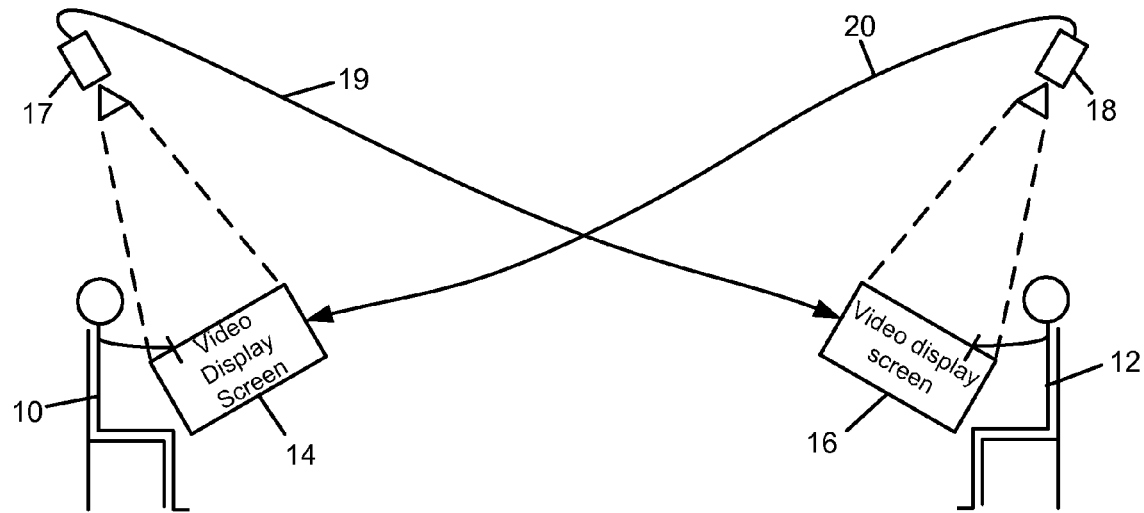
FIG. 1 is a schematic diagram of a remote workspace sharing system using only video display screens.

FIG. 1 is a schematic diagram of a video system used for remote workspace sharing as described in "VideoDraw: A Video Interface for Collaborative Drawing" Tang and Minneman 1990 Proc. of the Conference on Computer Human Interaction, pp 313-320. Two users 10, 12 each have a video display screen 14, 16, on which they are able to draw using dry erase pens. At each user location a video camera 17, 20 is provided which captures images of the video display screen and of any pen marks on the screen made by the user. In addition, the video camera captures images of the user's hand, pen and movement of the user's hand and pen. Hand gestures that are made in relation to the pen marks on the video display screen are also captured by the video camera.

A signal from the video camera 17 at one of the user locations is transferred to the video display 16 at the other user location and vice versa. This arrangement creates a composite shared drawing surface where the collaborators can see each other's marks and the hand gestures that are made in relation to those marks. For example, user 10 may view at video display screen 14, his or her own pen marks superimposed on a video presentation of the other user's 12 pen marks and hand gestures.

The arrangement of FIG. 1 enables hand gestures of the remote user to be viewed which assists the user's in mediating their interaction. However, the display is often difficult to use, suffering from blur and poor resolution, and requiring good lighting conditions that are relatively similar at each location. In addition, there is no tangible end work product and the use of dry erase pens on video display screens is messy and impractical for finer detail work such as editing documents.

Example Using Segmentation

In a first example, a remote workspace sharing system is described with reference to FIG. 2. Here each user has a tablet PC 200, 201 or other computer with a touch screen display which is connected to a communications network 202 in any suitable manner. The communications network 202 may be an intranet, an enterprise network, the internet or any other suitable type of communications network. A node in the communications network provides a collaborative work application 204 which has access to a memory at which a shared work product 203 is stored. The collaborative work application is of any suitable type, such as a shared whiteboard system, a shared document editing system, a shared drawing system, a computer game or other application. At each user location a video camera 205, 206 is provided which captures video images of a user's tablet PC display as well as any objects in a region 207, 208 around that display visible to the camera, such as the user's hand, stylus, coffee mug, pens, or other objects.

During operation of the collaborative work application 204 the shared work product 203 is displayed (block 50 of FIG. 5A) at the tablet PC displays 200, 201. Each time either of the user's makes a change to the shared work product, the record of that shared work product is updated (block 51 of FIG. 5A) at the communications network node and the displays at the user's locations are updated. This update may be made each time a specified user action occurs, such as a mouse click or other user action.

Figure 5A:
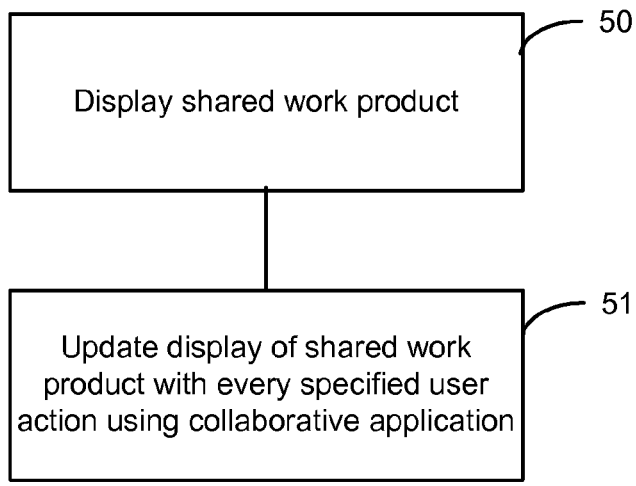
FIG. 5A is a diagram of a method of displaying a shared work product.
Figure 5B:
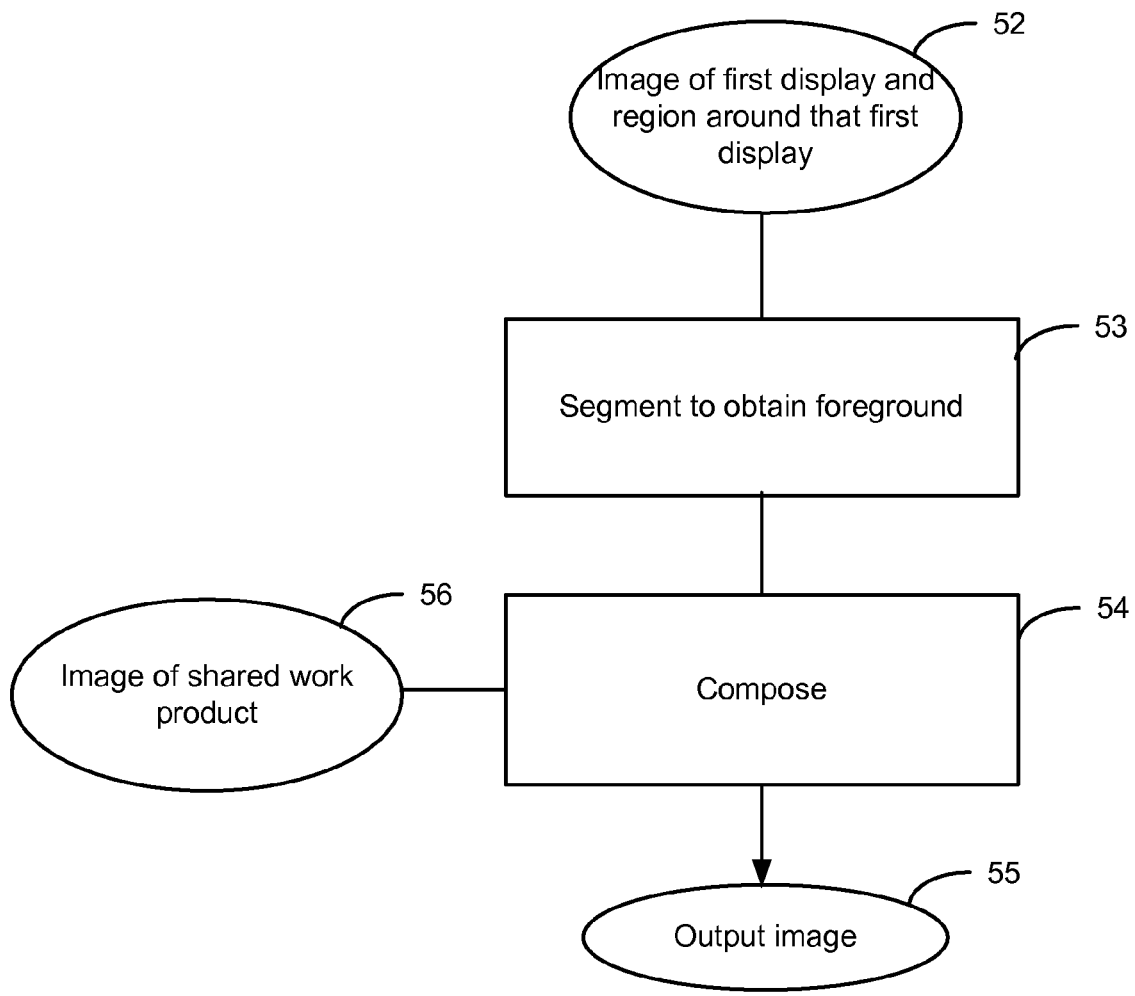
FIG. 5B is a diagram of a method of composing an output image using segmentation.

FIG. 5B illustrates an example method of using the remote workspace sharing system of FIG. 5A. A processor, either at the communications network collaborative work application 204 or at an end user's tablet PC 200, 201 (or other suitable location) has access to an image 56 of the shared work product 203 as well as to an image 52 received by one of the video cameras 205, 206. The processor segments (block 53) the image 52 received by one of the video cameras to obtain a foreground image. For example, the foreground image may be of a user's hand holding a stylus. The segmentation is achieved using any suitable segmentation algorithm. The processor takes the foreground image and the image of the shared work product 56 and composes (block 54) an output image 55 by combining those images in any suitable manner. Examples of methods of combining that may be used are described below. The composite output image 55 may then be presented at a remote user display.

In one example, segmentation may be achieved by using knowledge of the image of the shared work product and comparing this with the image captured by the video camera. Regions of the shared work product that are occluded, for example, by a user's hand, may be identified by such a comparison process. In this way foreground regions may be segmented from the image captured by the video camera.

In other embodiments, segmentation may be achieved by using image processing segmentation algorithms based on contrast analysis, edge detection, object recognition techniques and the like.

By segmenting to obtain the foreground image the resulting output image is clearer and easier to understand that the video whiteboard display of FIG. 1. Only parts of the image captured at the remote location are displayed at the other location rather than superimposing a complete image of the remote location at the other location. By extracting only the foreground, the information that is useful to assist in mediating user interaction is retained without other background information increasing complexity unnecessarily. In addition, less information needs to be transferred between the user locations than in the system of FIG. 1 thus saving on communications resources and improving processing time.

In some embodiments the processes of segmenting and composing may be carried out at the user locations and in other embodiments some or all of these processes may be carried out at locations in the communications network.

Example Using Depth Information

Figure 2:
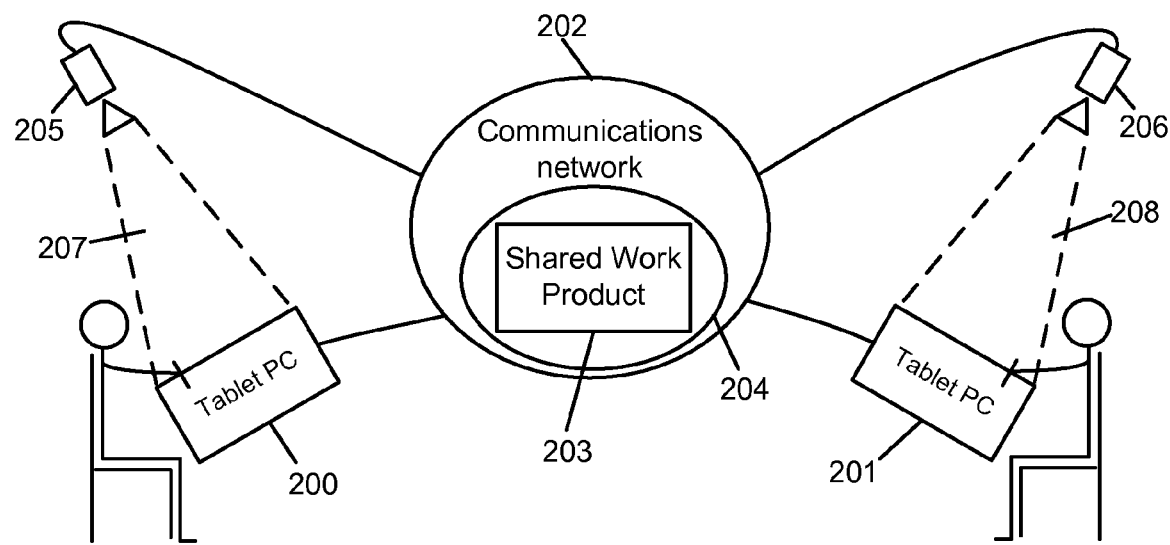
FIG. 2 is a schematic diagram of a remote workspace sharing system using a collaborative work application and video cameras.
Figure 6:
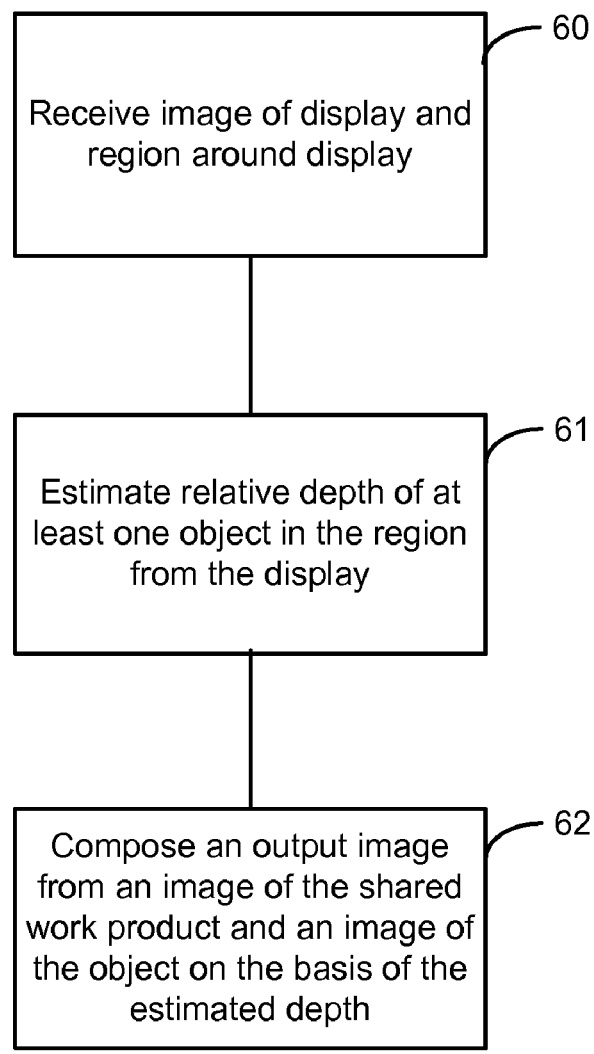
FIG. 6 is a diagram of a method of composing an output image for use in a remote workspace sharing system.

In another example, the system of FIG. 2 may be used to implement a remote workplace sharing method that uses depth information. In this case, the video cameras 205, 206 are mono cameras (i.e. not stereo cameras). Depth information is obtained from the images captured by those cameras using cues in those images such as occlusion, shadows, texture gradients, flow information between frames in the video sequence or other suitable information. An example method is now described with reference to FIG. 6. This method may be carried out at any suitable location such as a user location or a node in the communications network 202. An image is received (block 60) from one of the video cameras of a user display and a region around that display visible to the video camera. Any suitable depth estimation algorithm is used to estimate a relative depth of at least one object in the region visible to the video camera from the user display (block 61). An output image is then composed from the image of the shared work product and the image of the object on the basis of the estimated depth (block 62). For example, the two images may be combined using a weighting related to the estimated depth, or with transparency and/or blur applied in amounts related to the estimated depth as described in more detail below. The method of FIG. 6 is repeated, for example, for each frame of a video stream. By carrying out the processing in real time in this way information about user's hand movements and gestures are conveyed so as to facilitate collaborative interaction.

By using depth information to influence how the output image is formed collaborative work using the remote workplace sharing system is facilitated. More information is provided to the users which enables them to anticipate remote user actions and to mediate their collaboration. Abrupt changes to the display experienced in earlier systems are reduced because users are given information that enables them to anticipate and predict remote user actions as they would in a natural collaborative interaction. Also, there is no need to use a request and release protocol as has been the case in some earlier systems. The framework provided mimics the social interaction happening between two or more people sitting near each other and working together; yet it allows them to be conveniently apart. Also, seamless integration of real objects with virtual ones is enabled.

By providing remote workspace sharing in this way, the users at the different locations may each be positioned in front of their respective work product displays at the same time. This is an improvement over true face to face collaboration, where only one person may work directly in front of a document or other work product at a time.

Example Using Stereo

Figure 3:
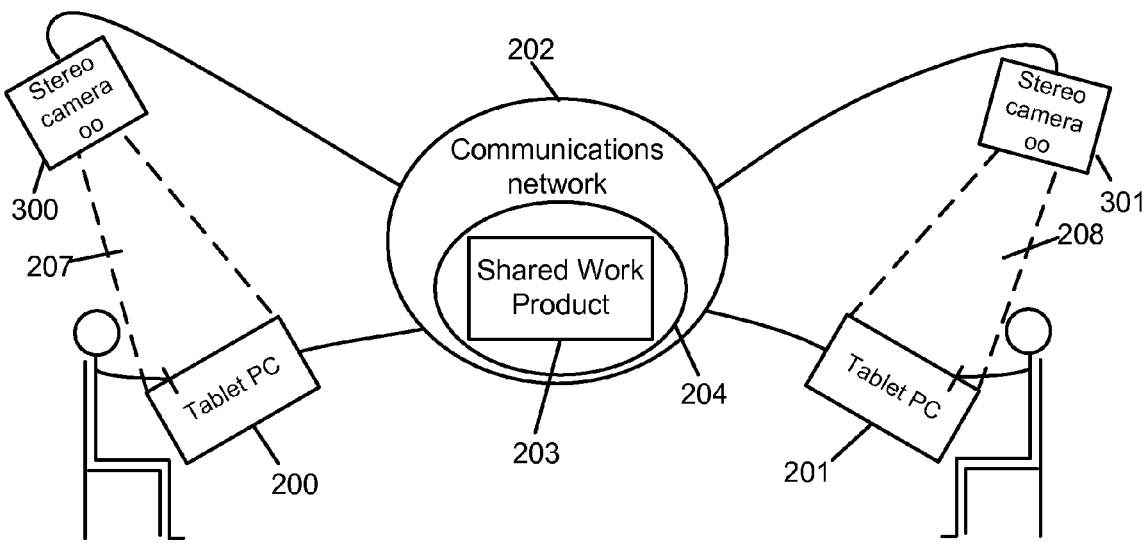
FIG. 3 is a schematic diagram of a remote workspace sharing system using a collaborative work application and stereo video cameras.

In another example, stereo video cameras are used at each user location as illustrated in FIG. 3. Stereo video cameras 300, 301 are used in place of the video cameras 205, 206 of FIG. 2 and otherwise the apparatus is arranged in a similar manner. For example, the stereo video cameras are positioned over head or at another suitable location. Using the information from the stereo video cameras 300, 301 it is possible to use stereo algorithms to estimate relative depth of objects between the video camera and the user display. This relative depth information may then be used to influence the manner in which the output image is composed. For example, an image of a remote user's hand may be made sharper and opaque when close to a display screen and blurred and transparent when far from a display screen.

Figure 7A:
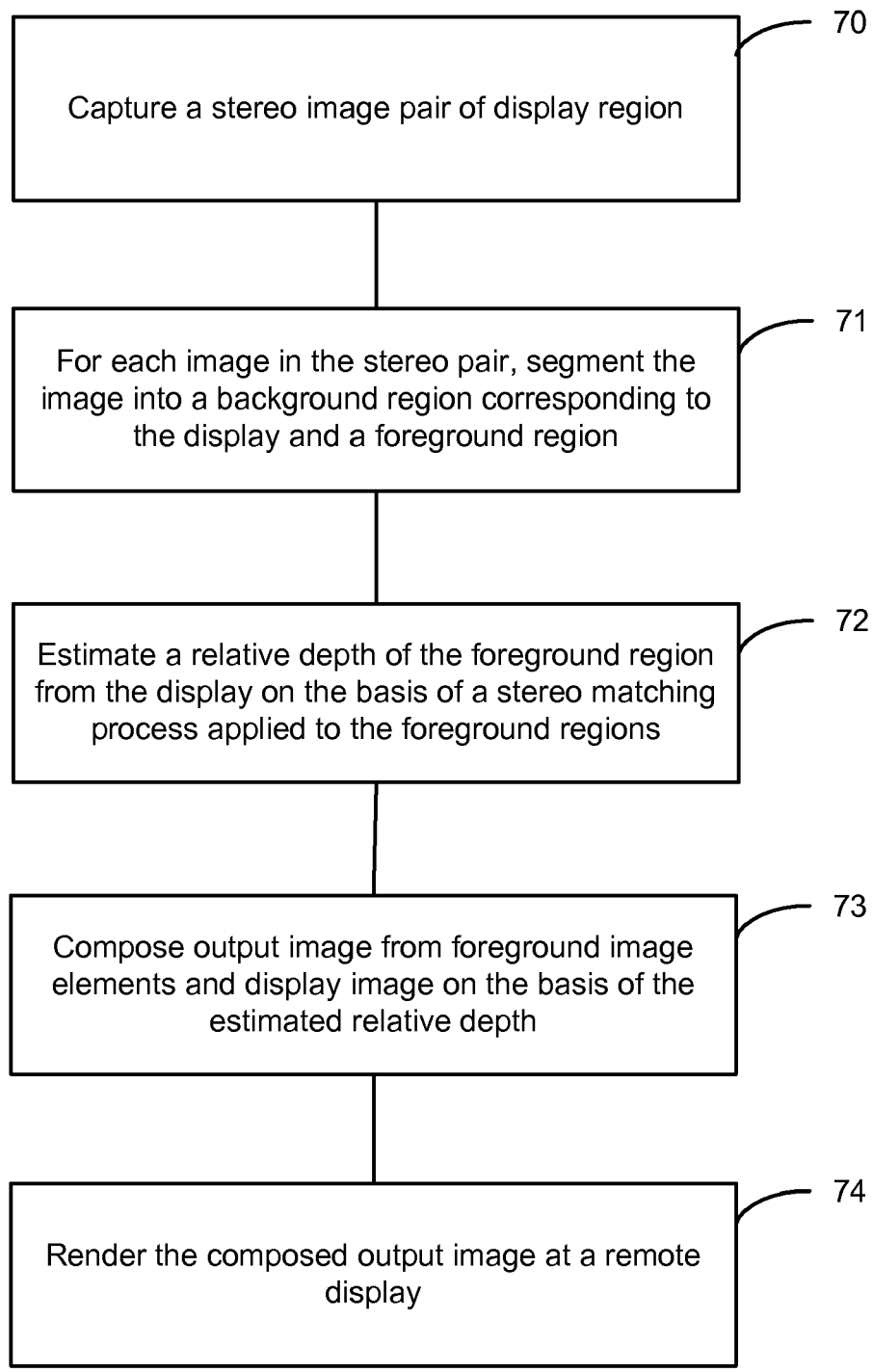
FIG. 7A is a diagram of a method for use in a remote workspace sharing system.

FIG. 7A is a diagram of a method of using stereo information in a remote workspace sharing system. A stereo image pair is captured (block 70) for example, using the video camera 300 of FIG. 3. These images are of a display 200 at a user location displaying a shared work product. In addition, any objects in a region 207 between the video camera 300 and the display 200 are imaged. For each image in the stereo pair, segmentation is carried out to segment that image into a background region corresponding to the display and a foreground region (block 71). Any suitable segmentation algorithm is used as mentioned above. A relative depth is estimated of the foreground region from the display on the basis of a stereo matching process applied to the foreground regions of the stereo pair (block 72). Any suitable stereo matching process may be used. The relative depth may comprise an average relative depth over the foreground region, a median relative depth, or any other suitable single relative depth value. Alternatively, relative depth values may be used for each image element in the foreground region, or any suitable combination of image elements.

An output image is composed (block 73) from the foreground image elements and the display image on the basis of the estimated relative depth information. The output image may then be rendered at a remote display (block 74).

Figure 7B:
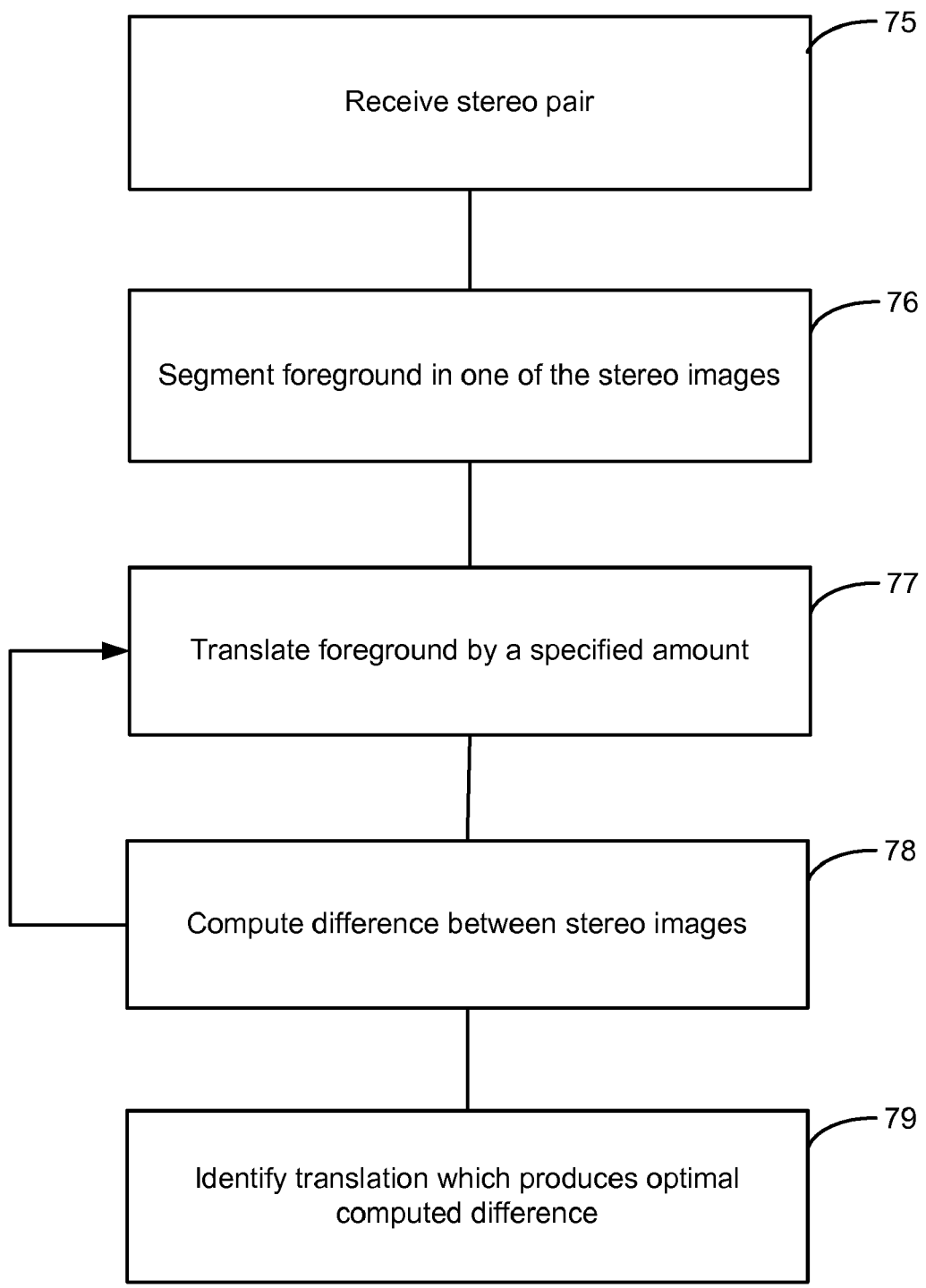
FIG. 7B is a diagram of a method of estimating relative depth information.

Any suitable stereo matching process may be used such as a dense stereo matching algorithm, or other suitable algorithm. In some embodiments a method now described with reference to FIG. 7B is used.

A stereo pair is received (block 75) and the foreground is segmented in one of those stereo images (block 76). The foreground is then translated incrementally across the image (block 77). At each position a correlation with the other image from the stereo pair, or a subtraction (block 78) against that other image is carried out. In this way the shift or translation of the foreground required to produce an optimal correlation, subtraction or other function result is identified (block 79) as being an estimate of the relative depth. This provides a computationally inexpensive and fast method for estimating the relative depth. By using this type of method it is possible to enable processing in real time or at a rate substantially equivalent to the video frame rate such that end users perceive a smooth display of motion of the foreground image regions. In addition, this processing may be carried out in the background on an end user's computer and take up low central processing unit (CPU) load on that computer.

Example Using Three or More User Locations

Figure 4:
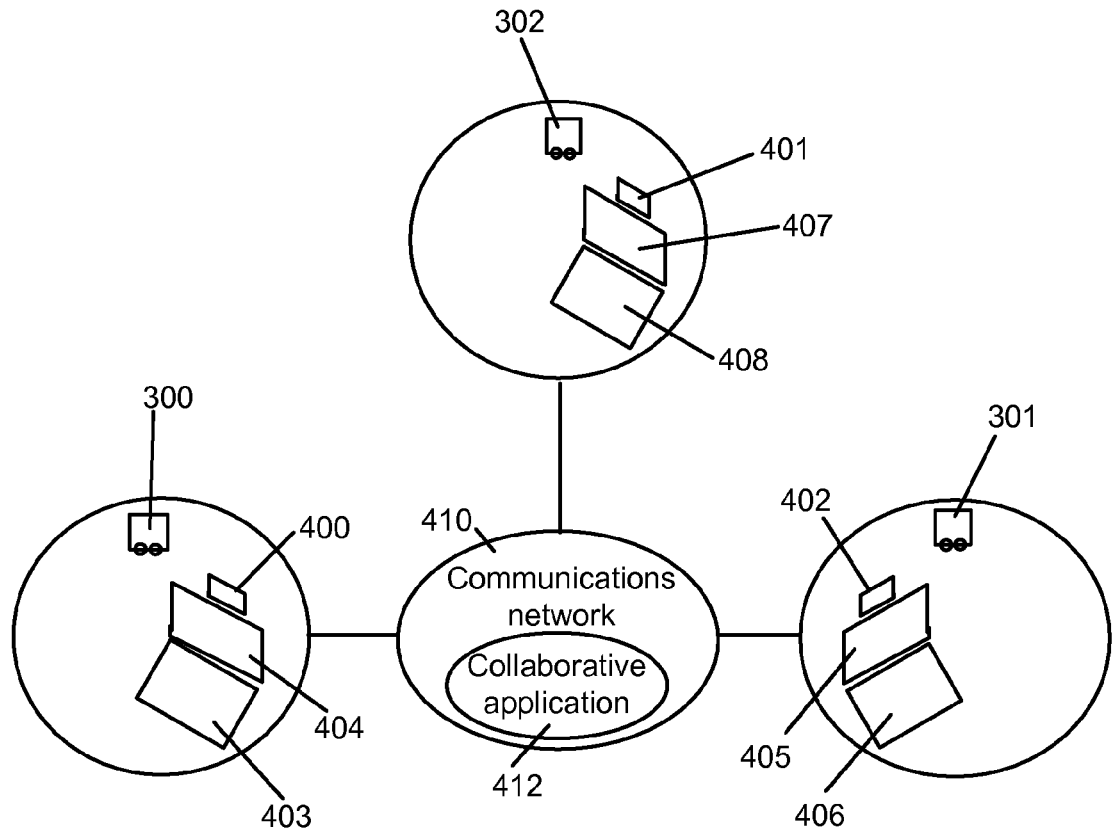
FIG. 4 is a schematic diagram of another remote workspace sharing system.

The examples mentioned above have been described with reference to two user locations. However, it is also possible to use three or more user locations as illustrated in FIG. 4. For example, at a first user location, a display 403 is provided which may be a computer screen, tablet PC screen, or other suitable display. Also provided at that location is a stereo video camera 300 positioned to capture a stream of video images of the display 403. Optionally provided is a second display 404 for displaying a video conference image of one or more remote users. A second video camera 400 may optionally be provided to capture a stream of video images of a user at the location.

At a second location, remote from the first, similar equipment is provided comprising display 406, stereo video camera 301, video conference display 405 and video camera 402.

At a third location, remote from the first and second locations, similar equipment is provided comprising display 408, stereo video camera 302, video conference display 407 and video camera 401.

The equipment at each user location is in communication with a communications network 410 comprising a collaborative work application 412. The stereo video cameras 300, 301, 302 and displays 403, 406, 408 are used as described above to enable remote workspace sharing. Different colors, textures or other representations may be used for differentiating foreground images from the different user locations. In this way, foreground images from more than one remote location may be presented at a single user display. Alternatively, a selection process is implemented which selects only one foreground image for display at any one time at a given user location. For example, this selection process may operate using preconfigured priority information for the user locations or by selecting on the basis of which user location is currently making changes to the work product.

Optionally the equipment at each user location also comprises a display for a video conference 404, 405, 407, which displays images of one or more of the remote users as known in the art. This is enables visual cues to be provided to end users which facilitate in the collaborative work process. For example, if a pause in activity occurs, the video conference display may indicate that this is because one or more of the remote users has turned away from the display. Video cameras 400, 402, 401 capture images of the end users to be used in this video conference process.

Composition Process

As mentioned above the composition process may comprise adding blur and/or transparency to the foreground region on the basis of the relative depth information. Alternatively, other graphics effects may be used to signal the presence of a hand or other object at a certain distance from the workspace. In an example, the amount of transparency to be applied to the foreground is directly proportional to the average disparity of the foreground image. However, this is not essential, any suitable relationship may be used.

In another example, the image composition process may be represented using the following equation:

$$I = \alpha S + (1-\alpha) H$$

where I represents the output image, H represents the foreground image, S represents the image of the shared work product rendered on the screen and $\alpha$ represents the amount of transparency to be applied (where $\alpha$ is equivalent to a relative depth value (such as a disparity) scaled to be between zero and 1).

In another example, the image composition process may be represented using the following equation:

$$I = \alpha(d)S + (1-\alpha(d)) \times (G(d) \text{ convolved with } H)$$

where I represents the output image, H represents the foreground image, S represents the image of the shared work product rendered on the screen, d represents a relative depth value (such as disparity) and α represents the amount of transparency to be applied. G represents a blurring function, such as a Gaussian or similar function. For example, when disparity is large the Gaussian function applied is arranged to have a broader curve so that more blur is applied.

As described above, the methods may be carried out for each frame of a video stream. It is also possible to apply temporal filtering in order to increase the robustness of the remote workspace sharing system.

Remote Game Playing Example

In an example, an application for remote game playing is provided at any suitable location in a remote workspace sharing system such as the communications network 202 of FIGS. 2, 3 and 410 of FIG. 4. In a particular example, the game is a two person board game such as GO. However, this is not essential, any computer game may be provided.

Suppose that two users at locations remote from one another are playing GO. An electronic display of a GO board is displayed at the tablet PCs or other displays 200, 201 and real GO stones are placed on the screens by the players. The remote workplace sharing system operates as described above so that an electronic image of the remote player's stones are displayed on the screen. Also placed on that display screen are real GO stones of the player using that display apparatus. In this way, real and virtual objects are used together. The playing experience is improved because players are able to use real playing pieces as they would in a face to face game. As soon as one player starts to move his or her hand in order to make a move this is visible to the remote player using the methods described above. Hand gestures and other movements that facilitate normal one on one interaction are available even though one player is remote from the other. This improves the playing experience.

Exemplary Operating Environment

Figure 8:
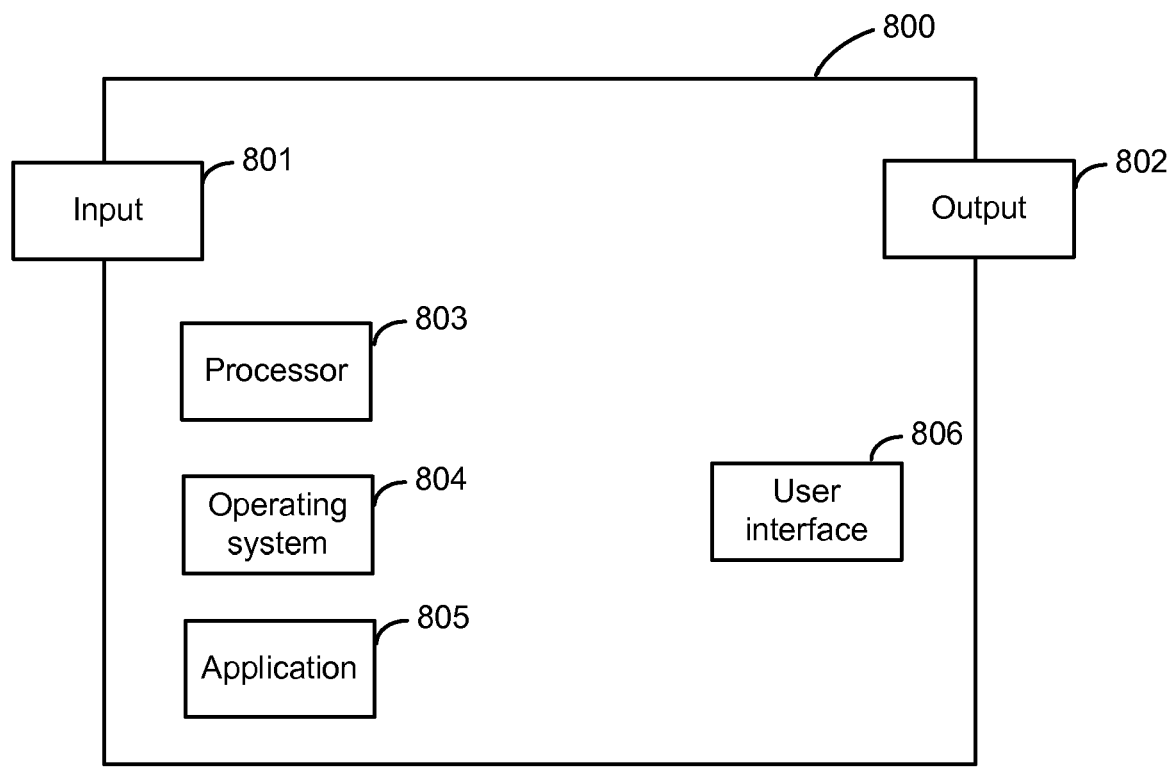
FIG. 8 is a schematic diagram of an exemplary operating environment.

FIG. 8 is a schematic diagram of an exemplary operating environment. An apparatus 800 for use in a remote workspace sharing system comprises an input 801 of any suitable type arranged to receive information comprising images. For example, these may be images from a video camera, a stereo video camera, images for rendering on a display comprising presentation of a shared work product or the like. An output 802 is also provided, again of any suitable type, and arranged to output an image for rendering on a display at a user location. The input 801 and output 802 may be links to a communications network or may be direct links to displays, cameras or other image acquisition equipment.

The apparatus 800 comprises a processor 803 of any suitable type such as a computer. An operating system 804 is provided and an application 805 for implementing methods for remote workspace sharing as described herein. The operating system 804 is of any suitable type as is the application 805. Optionally a user interface 806 is provided to enable a user to control the apparatus 800.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This application acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising receiving at least one image of a display of a shared work product and a region around that display;
    estimating a relative depth of at least one object in the region from the display; and
    composing an output image from an image of the shared work product and regions of the received image corresponding to the at least one object, the output image being made on the basis of the estimated relative depth.

2. A method as claimed in claim 1 which further comprises receiving a video stream of images of the display and the region around that display and carrying out the steps of estimating and composing for each frame of the video stream at a rate at least equal to a frame rate of the video stream.

3. A method as claimed in claim 1 which further comprises rendering the output image at a remote display.

4. A method as claimed in claim 1 which further comprises segmenting the received image into a background region corresponding to the display and a foreground region corresponding to any objects around the display.

5. A method as claimed in claim 1 which comprises receiving a stereo image pair of the display and the region around that display.

6. A method as claimed in claim 5 wherein estimating the relative depth comprises using a stereo matching process.

7. A method as claimed in claim 5 which comprises segmenting each image in the stereo image pair into a background region corresponding to the display and a foreground region corresponding to any objects around the display and using a stereo matching process only on the foreground regions.

8. A method as claimed in claim 1 wherein composing the output image comprises using an amount of transparency related to the estimated relative depth.

9. A method as claimed in claim 1 wherein composing the output image comprises using an amount of blur related to the estimated relative depth.

10. A method comprising:
    displaying an image of a shared work product at a first display;
    receiving at least one stereo image pair of the first display and a region around that first display;
    segmenting one image of the at least one stereo image pair to obtain a foreground image;
    estimating a relative depth of the foreground image from the first display by incrementally translating the foreground image across its associated stereo image; and
    composing an output image from an image of the shared work product and the foreground image on the basis of the estimated relative depth.

11. A method as claimed in claim 10 which further comprises displaying an image of a remote user at a second display positioned near the first display and arranged to display an image of the remote user during use of a collaborative work application with that remote user.

12. An apparatus comprising:
    an input arranged to receive at least one image of a display of a shared work product and a region around that display;
    a processor arranged to estimate a relative depth of at least one object in the region from the display; and
    wherein the processor is further arranged to compose an output image from an image of the shared work product and regions of the received image corresponding to the at least one object, the output image being made on the basis of the estimated relative depth.

13. An apparatus as claimed in claim 12 wherein the input comprises a video camera.

14. An apparatus as claimed in claim 13 wherein the processor is arranged to carry out the steps of estimating and composing for each frame of a video stream received by the video camera at a rate at least equal to a frame rate of the video stream.

15. An apparatus as claimed in claim 12 wherein the input comprises a stereo video camera.

16. An apparatus as claimed in claim 15 wherein the processor is arranged to estimate the relative depth using a stereo matching process.

17. An apparatus as claimed in claim 12 wherein the processor is further arranged to segment the received image into a background region corresponding to the display and a foreground region corresponding to any objects around the display.

18. An apparatus as claimed in claim 12 wherein the processor is arranged to compose the output image using an amount of transparency related to the estimated relative depth.

* * * * *